M. B. FLAHERTY.
TIRE.
APPLICATION FILED NOV. 10, 1920.
1,406,630.
Patented Feb. 14, 1922.
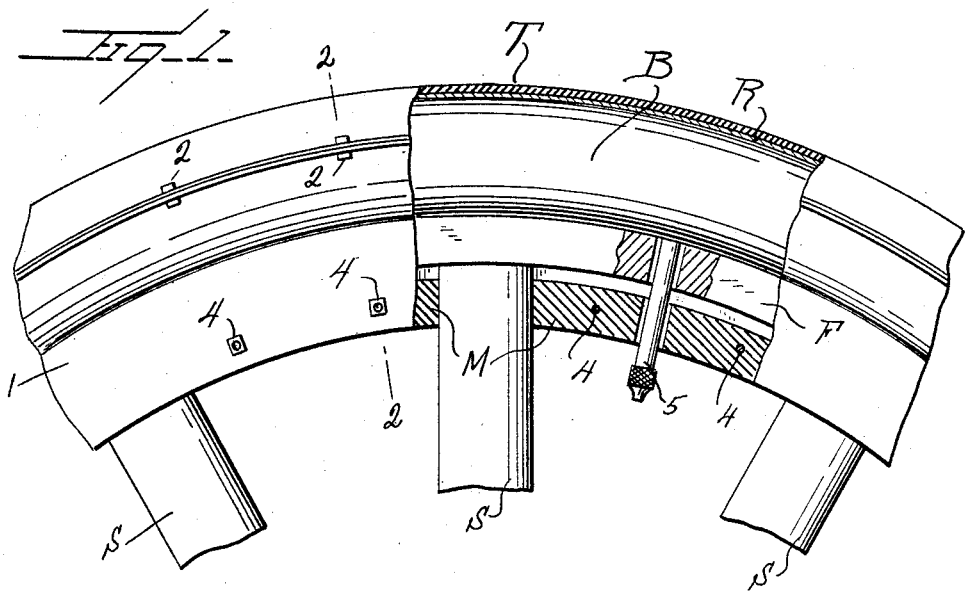
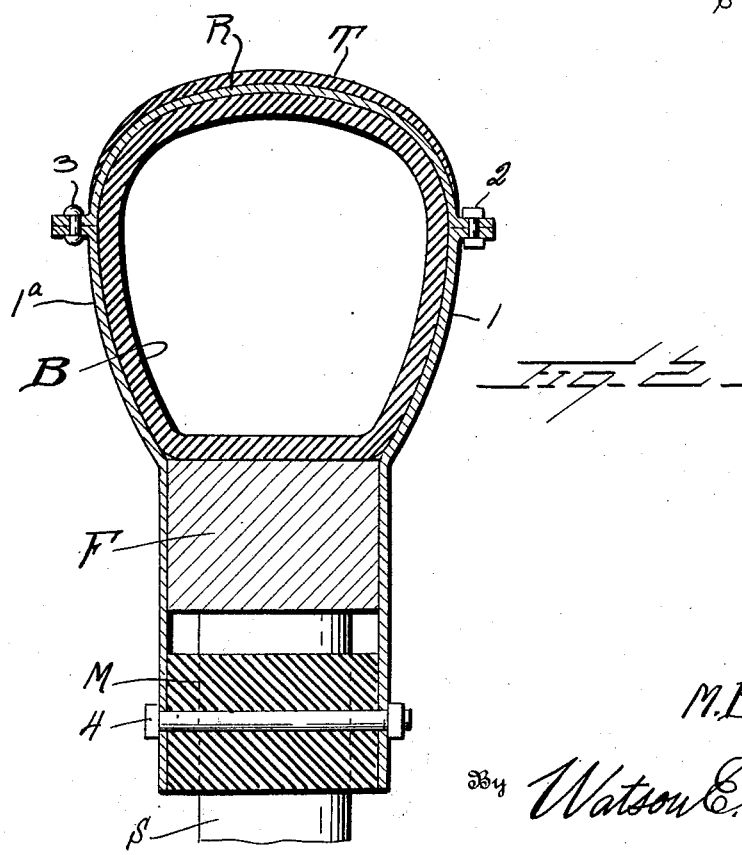
Inventor
M. B. Flaherty
By Watson E. Coleman
Attorney

UNITED STATES PATENT OFFICE.

MIKE B. FLAHERTY, OF STEUBENVILLE, OHIO, ASSIGNOR OF ONE-HALF TO JOHN L. SOBER, OF STEUBENVILLE, OHIO.

TIRE.

1,406,630. Specification of Letters Patent. Patented Feb. 14, 1922.

Application filed November 10, 1920. Serial No. 423,113.

*To all whom it may concern:*

Be it known that I, MIKE B. FLAHERTY, a citizen of the United States, residing at Steubenville, in the county of Jefferson and State of Ohio, have invented certain new and useful Improvements in Tires, of which the following is a specification, reference being had to the accompanying drawings.

This invention relates to certain improvements in tires for vehicle wheels or the like, and it is an object of the invention to provide a novel and improved device of this general character of a pneumatic type and wherein means are provided to protect effectually the inflatable body against puncture, blow-out or other injury.

Another object of the invention is to provide a novel and improved tire embodying a carcass substantially encasing the felly of a wheel and wherein an inflatable tire or body is arranged within the carcass outwardly of the felly and extending circumferentially of the wheel, said carcass serving effectually to protect the tube or inflatable member against injury.

The invention consists in the details of construction and in the combination and arrangement of the several parts of my improved tire for vehicle wheels or the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section illustrating a tire constructed in accordance with an embodiment of my invention and in applied position, and Figure 2 is an enlarged sectional view taken substantially on the line 2—2 of Figure 1.

As disclosed in the accompanying drawings, F denotes the felly of a vehicle wheel or the like. Disposed circumferentially of the felly is a rim R preferably of metal. The rim R has its marginal portions defined by the inwardly directed flanges 1 and 1ª, the flange 1 being preferably detachably engaged with the rim R by the removable bolts 2 or the like. While the flange 1ª may be integrally formed with the rim R, it is preferred that the flange 1ª be held to the rim R by the rivets 3 or the like.

The flanges 1 and 1ª are of a length to extend a distance inwardly of the felly F and to overlie the side faces or edges of the strips or members M disposed circumferentially of the felly F between the spokes S of the wheel. The spokes S are secured to the felly F in a conventional manner and the plates 1 and 1ª have sliding movement across the felly F. Each of the strips or members M is of rubber or kindred yieldable material and is secured to the inner marginal portions of the flanges 1 and 1ª by the bolts 4 extending transversely of the felly F and through the flanges 1 and 1ª of the rim R.

The rim R is spaced the desired distance from the periphery of the felly F and is substantially concentric to said felly when the wheel is free of load. Arranged within the space between the felly F and the rim R is an inflatable body or tube B having in communication therewith an inflating valve 5 of a conventional type whereby the body or tube B may be filled with air under a desired degree of pressure.

With my improved tire, it is to be noted that the tire is in no way directly secured to the felly F yet the rim R is capable of the requisite movement with respect to the wheel structure proper to compensate for the shocks and jars incident to travel.

The strips or members M are spaced a slight distance from the inner surface of the felly F to prevent jamming and particularly when the wheel to which the tire T is applied is under load.

Disposed circumferentially of the rim R and suitably secured to the outer face thereof is the tread member T preferably comprising a conventional type of solid rubber tire.

With a tire constructed in accordance with my invention, it will at once be noted that the inflatable body or casing B is effectively protected against puncture and also against blow-out or other injury so that the life of the structure is materially prolonged.

When the wheel structure is in transit, the members or blocks M serve as cushioning agencies to absorb the shocks incident to travel, as said members or blocks M will be moved inwardly between the adjacent spokes S which, as is conventional, are in convergence toward the axle of the wheel.

It is to be understood that the member or strip M may be of wood or other material when the occasions of practice may require and particularly when it may be necessary to make a repair.

From the foregoing description it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire structure comprising in combination with the felly of a wheel and the spokes associated therewith, a rim disposed circumferentially around the felly and spaced therefrom, said rim being provided with inwardly directed side flanges overlying the sides of the felly and extending inwardly thereof, cushioning members supported between the inwardly extended portions of the flanges and between adjacent spokes and contacting therewith and an inflatable body interposed between the felly and the rim.

2. A tire structure comprising in combination with the felly of a wheel and the spokes associated therewith, a rim disposed circumferentially around the felly and spaced therefrom, said rim being provided with inwardly directed side flanges overlying the sides of the felly and extending inwardly thereof, yieldable members supported between the inwardly extended portions of the flanges and between adjacent spokes and contacting therewith and an inflatable body interposed between the felly and the rim.

3. A tire structure comprising, in combination with the felly of a wheel and the spokes associated therewith, a rim disposed circumferentially around the felly and spaced therefrom, a cushioning agency interposed between the felly of the wheel and the rim, said rim being provided with inwardly directed side flanges overlying the sides of the felly and extending inwardly thereof, and yieldable members secured to the inwardly extending portions of the flanges between the adjacent spokes and contacting therewith.

In testimony whereof I hereunto affix my signature.

MIKE B. FLAHERTY.